(12) United States Patent
Sharma et al.

(10) Patent No.: US 12,117,939 B2
(45) Date of Patent: Oct. 15, 2024

(54) STOCHASTIC OPTIMIZATION OF SURFACE CACHEABILITY IN PARALLEL PROCESSING UNITS

(71) Applicant: ADVANCED MICRO DEVICES, INC., Santa Clara, CA (US)

(72) Inventors: Saurabh Sharma, Santa Clara, CA (US); Jeremy Lukacs, Santa Clara, CA (US); Hashem Hashemi, Roseville, CA (US); Gianpaolo Tommasi, Santa Clara, CA (US); Christopher J. Brennan, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/557,475

(22) Filed: Dec. 21, 2021

(65) Prior Publication Data

US 2023/0195639 A1 Jun. 22, 2023

(51) Int. Cl.
*G06F 12/00* (2006.01)
*G06F 12/0893* (2016.01)

(52) U.S. Cl.
CPC .. *G06F 12/0893* (2013.01); *G06F 2212/6042* (2013.01)

(58) Field of Classification Search
CPC .......... G06F 12/0848; G06F 2212/282; G06F 3/0658; G06F 3/0644; G06F 3/0656; G06F 3/0604; G06F 3/0683; G06F 11/3034; G06F 11/3037; G06F 11/3409; G06F 2201/88; G06F 3/0619; G06F 3/064; G06F 3/0659; G06F 3/0679; G06F 3/0688; G06F 3/061
See application file for complete search history.

(56) References Cited

U.S. PATENT DOCUMENTS

| | | | | |
|---|---|---|---|---|
| 8,490,065 | B2 * | 7/2013 | Archambault | G06F 9/30047 717/130 |
| 2005/0007377 | A1 * | 1/2005 | Hong | G06T 1/60 345/557 |
| 2010/0057993 | A1 * | 3/2010 | Alben | G06F 12/0875 711/170 |

(Continued)

FOREIGN PATENT DOCUMENTS

JP 2019168733 10/2019

OTHER PUBLICATIONS

International Search Report and Written Opinion issued in Application No. PCT/US2022/052964, mailed May 4, 2023, 11 pages.

(Continued)

*Primary Examiner* — Arvind Talukdar

(57) ABSTRACT

A processing system selectively allocates storage at a local cache of a parallel processing unit for cache lines of a repeating pattern of data that exceeds the storage capacity of the cache. The processing system identifies repeating patterns of data having cache lines that have a reuse distance that exceeds the storage capacity of the cache. A cache controller allocates storage for only a subset of cache lines of the repeating pattern of data at the cache and excludes the remainder of cache lines of the repeating pattern of data from the cache. By restricting the cache to store only a subset of cache lines of the repeating pattern of data, the cache controller increases the hit rate at the cache for the subset of cache lines.

20 Claims, 8 Drawing Sheets

(56) References Cited

U.S. PATENT DOCUMENTS

| | | | |
|---|---|---|---|
| 2013/0106851 A1* | 5/2013 | Tremblay | G06T 17/20 |
| | | | 345/423 |
| 2016/0062916 A1* | 3/2016 | Das | G06F 12/1027 |
| | | | 711/133 |
| 2017/0003884 A1 | 1/2017 | Mak et al. | |
| 2018/0011790 A1 | 1/2018 | Gaur et al. | |
| 2019/0392299 A1 | 12/2019 | Ma | |
| 2021/0004331 A1* | 1/2021 | Ramani | G06F 12/0888 |
| 2021/0342156 A1 | 11/2021 | Eyole et al. | |
| 2022/0391323 A1* | 12/2022 | Ryu | G06F 13/1668 |

OTHER PUBLICATIONS

International Preliminary Report on Patentability issued in Application No. PCT/US2022/052964, mailed Jul. 4, 2024, 8 pages.

\* cited by examiner

STOCHASTIC OPTIMIZATION OF SURFACE CACHEABILITY IN PARALLEL PROCESSING UNITS

BACKGROUND

Processing systems including parallel processing units such as graphics processing units (GPUs) implement a cache hierarchy (or multilevel cache) that uses a hierarchy of caches of varying speeds to store frequently accessed data. Data that is requested more frequently is typically cached in a relatively high-speed cache (such as an L1 cache) that is deployed physically (or logically) closer to a processor core or compute unit. Higher-level caches (such as an L2 cache, an L3 cache, and the like) store data that is requested less frequently. A last level cache (LLC) is the highest level (and lowest access speed) cache and the LLC reads data directly from system memory and writes data directly to the system memory. Caches differ from system memory because they implement a cache replacement policy to replace the data in a cache line in response to new data needing to be written to the cache line. For example, a least-recently-used (LRU) policy replaces data in a cache line that has not been accessed for the longest time interval by evicting the data in the LRU cache line and writing new data to the LRU cache line.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
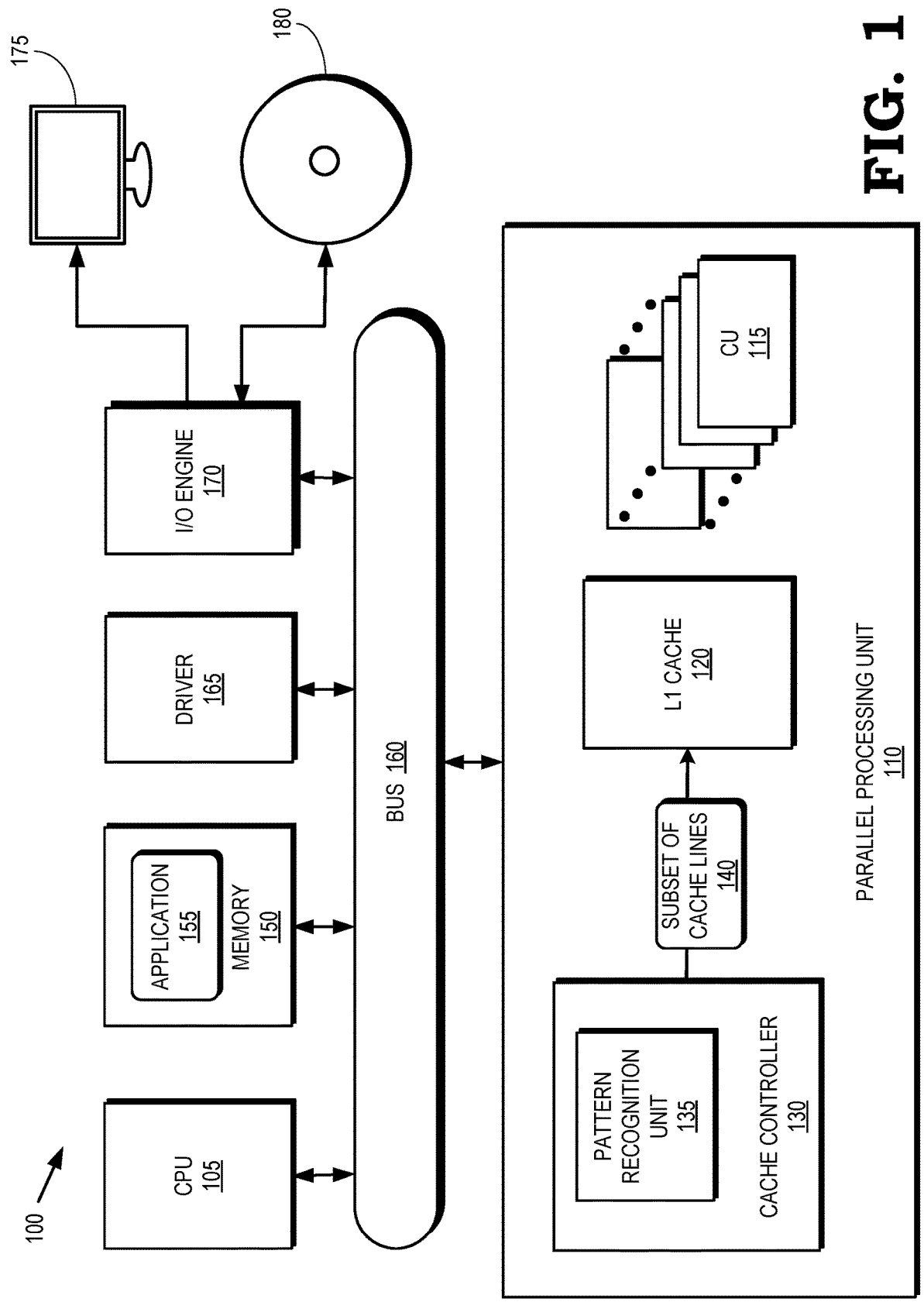
FIG. 1 is a block diagram of a processing system configured to selectively cache subsets of repeating patterns of data in accordance with some embodiments.

Processor cores of parallel processing units often execute dispatches of work items that successively access repeating patterns of data such as surfaces. To illustrate, a surface such as texture that is attached to a series of dispatches of work items is read in successive rendering or denoising passes. For example, many elements of a scene of a video game are rendered in successive frames as the position or angle of a camera view changes. The successive passes require the same texture data that maps to the pixels. In some instances, the size of a texture exceeds the storage capacity of the lowest level cache (the L1 cache) of a parallel processing unit.

Conventionally, a cache controller of the L1 cache employs an LRU cache replacement policy and fetches data requested by a processor core that is not currently stored at the L1 cache (i.e., a cache miss) from a higher-level cache in the cache hierarchy. To make room for the requested cache line, the least-recently-used cache line in the L1 cache is evicted. However, if the reuse distance for a repeating pattern of data (i.e., a number of cache lines in each repetition of the pattern) exceeds the storage capacity of the L1 cache, by the time a new request for a cache line in the repeating pattern of data is received by the cache controller, the cache line will have already been evicted from the cache, resulting in a low (or zero) hit rate. Retrieving the data from more remote levels of the memory hierarchy so the data can be accessed by the subsequent dispatch consumes resources and increases latency.

FIGS. 1-8 illustrate techniques for a processing system to selectively allocate storage at a local cache of a parallel processing unit for cache lines of a repeating pattern of data, when the repeating pattern is of a size that exceeds the storage capacity of the cache. The processing system identifies repeating patterns of data having cache lines that have a reuse distance that exceeds the storage capacity of the cache. A cache controller allocates storage for only a subset (i.e., some but not all) of the cache lines of the repeating pattern of data at the cache and excludes the remainder of cache lines of the repeating pattern of data from the cache. For example, if the maximum number of cache lines that the cache can store at one time is X cache lines and the processing system identifies a repeating pattern of data that is X+Y cache lines, in some embodiments the cache controller allocates storage for only the first X cache lines of the repeating pattern of data and excludes the remaining Y cache lines from being stored at the cache. In response to requests from a processor core for the remaining Y cache lines, the cache controller provides the remaining Y cache lines directly to the processor core from a higher level of the cache hierarchy and bypasses storing the Y cache lines at the cache. By restricting the cache to store only the first X cache lines of the repeating pattern of data, the cache controller increases the hit rate at the cache for the first X cache lines, thus decreasing latency and improving the user experience.

In some embodiments, the processing system stochastically selects a subset of cache lines from the repeating pattern of data to store at the cache in an iterative process. The processing system measures a hit rate for each selected subset of cache lines and selects cache lines of the repeating pattern of data to exclude from the cache based on the hit rate. In some embodiments, the cache controller partitions the cache into two or more portions and assigns one portion of the cache to store a subset cache lines of a first repeating pattern of data and another portion of the cache to store a subset of cache lines of a second repeating pattern of data. For a partitioned cache, the cache controller compares a reuse distance of a cache line of the first repeating pattern of data to the storage capacity of the portion of the cache to which the first repeating pattern of data is assigned. Based on the reuse distance and the storage capacity of the portion of the cache, the cache controller selects a subset of the cache lines of the first repeating pattern of data to store at the cache and excludes the remaining cache lines of the first repeating pattern of data from the cache.

FIG. 1 illustrates a processing system 100 configured to selectively allocate storage at a local cache of a parallel processing unit for cache lines of a repeating pattern of data that exceeds the storage capacity of the cache in accordance with some embodiments. The processing system 100 includes a parallel processing unit 110 such as a graphics processing unit (GPU) for creating visual images intended for output to a display 175 according to some embodiments. A parallel processor is a processor that is able to execute a single instruction on a multiple data or threads in a parallel manner. Examples of parallel processors include processors such as graphics processing units (GPUs), massively parallel processors, single instruction multiple data (SIMD) architecture processors, and single instruction multiple thread (SIMT) architecture processors for performing graphics, machine intelligence or compute operations. In some implementations, parallel processors are separate devices that are included as part of a computer. In other implementations such as advance processor units, parallel processors are included in a single device along with a host processor such as a central processor unit (CPU). Although the below description uses a graphics processing unit (GPU), for illustration purposes, the embodiments and implementations described below are applicable to other types of parallel processors.

The processing system 100 includes a system memory 150 (referred to herein as memory 150). Some embodiments of the memory 150 are implemented as a dynamic random access memory (DRAM). However, the memory 150 can also be implemented using other types of memory including static random access memory (SRAM), nonvolatile RAM, and the like. In the illustrated embodiment, the parallel processing unit 110 communicates with the memory 150 over a bus 160. However, some embodiments of the parallel processing unit 110 communicate with the memory 150 over a direct connection or via other buses, bridges, switches, routers, and the like. The parallel processing unit 110 executes instructions stored in the memory 150 and the parallel processing unit 110 stores information in the memory 150 such as the results of the executed instructions. For example, the memory 150 can store a copy of instructions from an application 155 that is to be executed by the parallel processing unit 110. Some embodiments of the parallel processing unit 110 include multiple processor cores (referred to as compute units) 115 that independently execute instructions concurrently or in parallel.

The processing system 100 is generally configured to execute sets of instructions (e.g., computer programs) such as application 155 to carry out specified tasks for an electronic device. Examples of such tasks include controlling aspects of the operation of the electronic device, displaying information to a user to provide a specified user experience, communicating with other electronic devices, and the like. Accordingly, in different embodiments the processing system 100 is employed in one of a number of types of electronic device, such as a desktop computer, laptop computer, server, game console, tablet, smartphone, and the like. Components of the processing system 100 are implemented as hardware, firmware, software, or any combination thereof. It should be appreciated that processing system 100 may include more or fewer components than illustrated in FIG. 1. For example, processing system 100 may additionally include one or more input interfaces, non-volatile storage, one or more output interfaces, network interfaces, and one or more displays or display interfaces.

The processing system 100 includes a central processing unit (CPU) 105 for executing instructions. Some embodiments of the CPU 105 include multiple processor cores (not shown in the interest of clarity) that independently execute instructions concurrently or in parallel. The CPU 105 is also connected to the bus 160 and therefore communicates with the parallel processing unit 110 and the memory 150 via the bus 160. The CPU 105 executes instructions such as program code for the application 155 stored in the memory 150 and the CPU 105 stores information in the memory 150 such as the results of the executed instructions. The CPU 105 is also able to initiate graphics processing by issuing draw calls to the parallel processing unit 110. A draw call is a command that is generated by the CPU 105 and transmitted to the parallel processing unit 110 to instruct the parallel processing unit 110 render an object in a frame (or a portion of an object). Some embodiments of a draw call include information defining textures, states, shaders, rendering objects, buffers, and the like that are used by the parallel processing unit 110 to render the object or portion thereof. The parallel processing unit 110 renders the object to produce values of pixels that are provided to a display 175, which uses the pixel values to display an image that represents the rendered object.

In some embodiments, each frame to be rendered is processed by the parallel processing unit 110 graphics pipeline in multiple passes. For example, during a first pass over the scene geometry, only the attributes necessary to compute per-pixel lighting are written to a G-buffer. During a second pass, the graphics pipeline outputs only diffuse and specular lighting data. In a third pass of the frame through the graphics pipeline, the graphics pipeline reads back lighting data and outputs the final per-pixel shading. Thus, in multi-pass rendering, a scene and associated objects of a frame are rendered multiple times. Each time the object is drawn, the graphics pipeline calculates an additional aspect of object's appearance and combines the additional aspect with the previous results. Each time the frame or objects of the frame are rendered by the graphics pipeline is referred to as a render pass.

An input/output (I/O) engine 170 handles input or output operations associated with the display 175, as well as other elements of the processing system 100 such as keyboards, mice, printers, external disks, and the like. The I/O engine 170 is coupled to the bus 160 so that the I/O engine 170 communicates with the parallel processing unit 110, the memory 150, or the CPU 105. In the illustrated embodiment, the I/O engine 170 is configured to read information stored on an external storage medium 180, such as a compact disk (CD), a digital video disc (DVD), and the like. The external storage medium 180 stores information representative of program code used to implement an application such as a video game. The program code on the external storage medium 180 can be written to the memory 150 to form a copy of instructions that are to be executed by the parallel processing unit 110 or the CPU 105.

In some embodiments, the parallel processing unit 110 implements a graphics pipeline (not shown in FIG. 1 in the interest of clarity) that includes multiple stages configured for concurrent processing of different primitives in response to a draw call. Stages of the graphics pipeline in the parallel processing unit 110 can concurrently process different primitives generated by an application, such as a video game. When geometry is submitted to the graphics pipeline, hardware state settings are chosen to define a state of the graphics pipeline. Examples of state include rasterizer state, a blend state, a depth stencil state, a primitive topology type of the submitted geometry, and the shaders (e.g., vertex shader, domain shader, geometry shader, hull shader, pixel shader, and the like) that are used to render the scene. The shaders that are implemented in the graphics pipeline state are represented by corresponding byte codes. In some cases, the information representing the graphics pipeline state is hashed or compressed to provide a more efficient representation of the graphics pipeline state.

Driver 165 is a computer program that allows a higher-level graphics computing program, such as from application 155, to interact with parallel processing unit 110. For example, the driver 165 translates standard code received from application 155 into a native format command stream understood by parallel processing unit 110. Driver 165 allows input from application 155 to direct settings of the parallel processing unit 110. Such settings include selection of a render mode, an anti-aliasing control, a texture filter control, a batch binning control, and deferred pixel shading control.

To execute the sets of commands received from the CPU, the parallel processing unit 110 includes a plurality of compute units 115 and an L1 cache 120. The plurality of compute units 115 together perform shading operations on dispatches of work items (not shown). In different embodiments, the compute units 115 perform geometry operations, texture operations, tessellation operations, vertex operations, mesh operations, primitive operations, ray tracing operations, compute operations, and the like or any combination thereof, based on commands received from a command processor (not shown). In some embodiments, to perform these operations the compute units 115 each include one or more SIMD elements configured to execute the specified operations using the work items of the received dispatches.

The L1 cache 120 stores data for the plurality of compute units 115. Thus, in the course of executing shader operations, the plurality of compute units 115 stores and retrieves data from the L1 cache 120, wherein the stored and retrieved data is based on the particular work items being processed. For example, in some embodiments each work item of a dispatch corresponds to an individual pixel of an image, and the L1 cache 120 stores data (e.g., texture values) for each individual pixel, or a subset of the individual pixels, included in the dispatch. In some embodiments, the parallel processing unit 110 is associated with a memory hierarchy having multiple cache levels as well as the system memory 150, and the L1 cache 120 represents the lowest level of the multiple cache levels.

To increase the hit rate at the L1 cache 120 for repeating patterns of data that exceed the storage capacity of the L1 cache 120, the parallel processing unit 110 includes a cache controller 130 configured to allocate storage for only a subset 140 of cache lines of the repeating pattern of data at the L1 cache 120 and exclude the remainder of cache lines of the repeating pattern of data from the cache. In response to requests from the compute units 115 for the remainder of cache lines of the repeating pattern of data, the cache controller 130 provides the remaining cache lines directly to the compute unit(s) 115 from a higher level of the cache hierarchy (not shown) and bypasses storing the remaining cache lines at the L1 cache 120. By restricting the L1 cache 120 to store only the cache lines of the repeating pattern of data that fit within the storage capacity of the L1 cache 120 at the same time, the cache controller 130 increases the hit rate at the L1 cache 120 for the selected subset 140 of cache lines.

The cache controller 130 includes a pattern recognition unit 135 configured to identify repeating patterns of data that exceed the storage capacity of the L1 cache 120. The pattern recognition unit 135 measures a reuse distance of cache lines in the repeating pattern of data (i.e., a number of cache lines in each repetition of the pattern) and compares the reuse distance $D_R$ to the total number of cache lines the L1 cache 120 is capable of storing $C_{L1}$ (i.e., the storage capacity of the L1 cache 120). If the reuse distance $D_R$ exceeds the storage capacity $C_{L1}$ of the L1 cache 120, the cache controller 130 restricts the number of cache lines of the repeating pattern of data that are allocated storage space in the L1 cache 120 to the subset 140 of cache lines that will fit within the storage capacity $C_{L1}$ of the L1 cache 120. The cache controller 130 excludes the remaining $D_R$-$C_{L1}$ cache lines of the repeating pattern of data from the L1 cache 120. In some embodiments, in response to the L1 cache 120 exhibiting a relatively low hit rate, the pattern recognition unit 135 stochastically selects a subset of cache lines from the repeating pattern of data to store at the L1 cache 120 in an iterative process. The cache controller 130 measures a hit rate for each selected subset of cache lines and selects cache lines of the repeating pattern of data to exclude from the cache based on the hit rate.

In some embodiments, each draw call is associated with an identifier (not shown), and the request stream for a series of dispatches of work items includes the draw call identifier and the surface on which the draw call is to operate. The pattern recognition unit 135 tracks the number of requests for a draw call identifier/surface combination that are excluded from the L1 cache 120. The pattern recognition unit 135 lists the draw call identifier/surface combinations according to the frequency with which they are excluded from the L1 cache 120. In some embodiments, the cache controller 130 simulates a hit rate for selected subsets of cache lines 140 based on inclusion or exclusion of the draw call identifier/surface combinations from the L1 cache 120 to determine which draw call identifier/surface combinations to exclude from the L1 cache 120 to increase the hit rate.

In some embodiments, the cache controller 130 partitions the L1 cache 120 into two or more portions (not shown) and assigns one portion of the L1 cache 120 to store a subset cache lines of a first repeating pattern of data and another portion of the L1 cache 120 to store a subset of cache lines of a second repeating pattern of data. For a partitioned L1 cache 120, the cache controller 130 compares a reuse distance $D_R$ of a cache line of the first repeating pattern of data to the storage capacity of the portion of the cache to which the first repeating pattern of data is assigned. Based on the reuse distance $D_R$ and the storage capacity of the portion of the cache, the cache controller 130 selects a subset of the cache lines of the first repeating pattern of data to store at the cache and excludes the remaining cache lines of the first repeating pattern of data from the cache.

Figure 2:
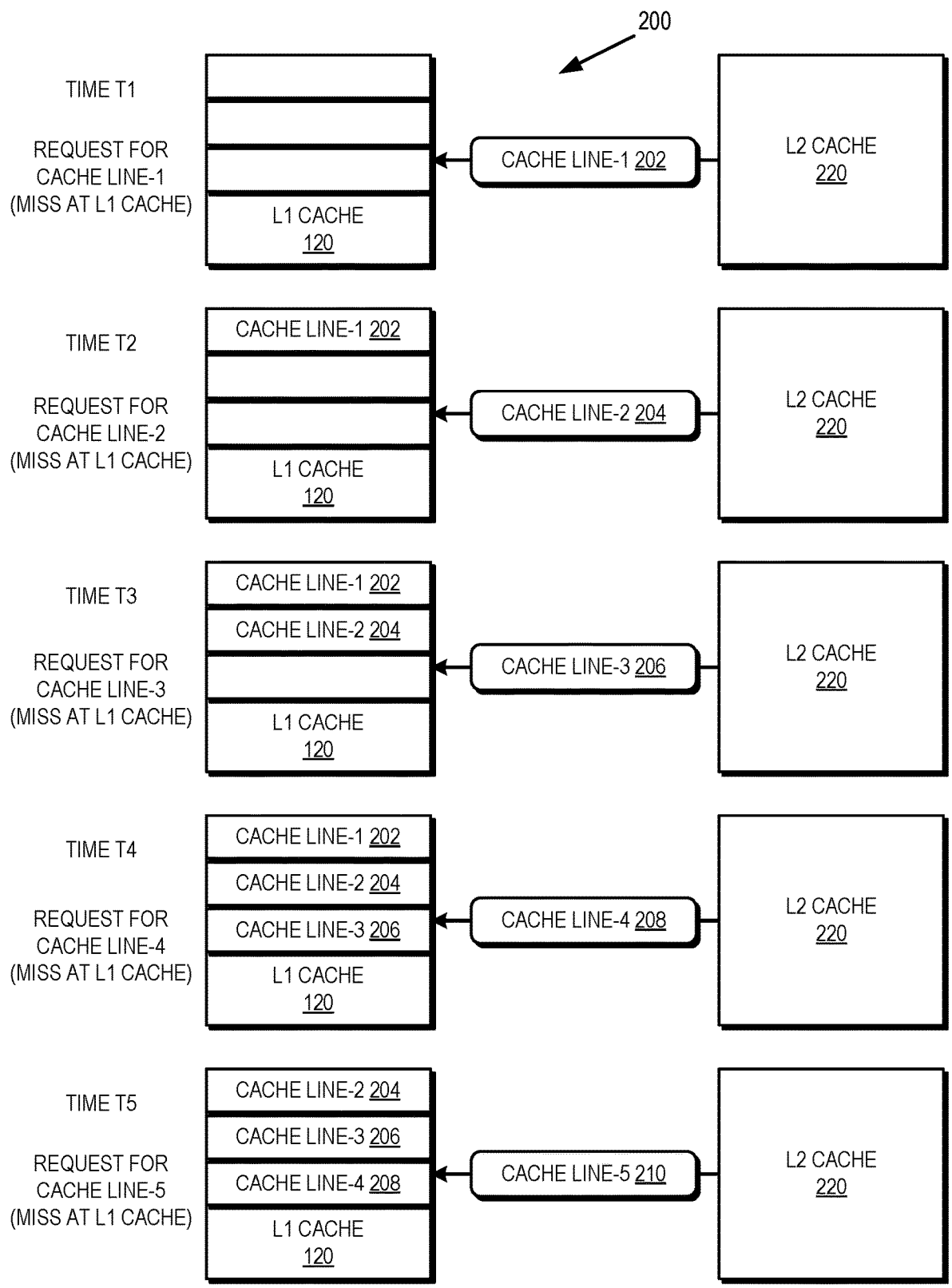
FIG. 2 is an illustration of caching of repeating patterns of data without selecting subsets of repeating patterns in accordance with some embodiments.

FIG. 2 is an illustration 200 of caching of repeating patterns of data without selecting a subset of cache lines based on a reuse distance in accordance with some embodiments. In the illustrated example, the L1 cache 120 is sized to hold up to three cache lines at a time. After the L1 cache 120 has been flushed, at a time T1, the cache controller 130 receives a request from a compute unit 115 for cache line-1 202. Because the L1 cache 120 contains no valid data, the request results in a miss at the L1 cache 120, and the cache controller 130 copies cache line-1 202 from a higher-level cache in the cache hierarchy, the L2 cache 220, to the L1 cache 120 and provides the cache line-1 202 to the compute unit 115. At a subsequent time T2, the cache controller 130 receives a request from a compute unit 115 for cache line-2 204. Because the L1 cache 120 does not contain cache line-2 204, the request results in a miss at the L1 cache 120, and the cache controller 130 copies cache line-2 204 from the L2 cache 220 to the L1 cache 120 and provides the cache line-2 204 to the compute unit 115. At a subsequent time T3, the cache controller receives a request from a compute unit 115 for cache line-3 206. Because the L1 cache 120 does not contain cache line-3 206, the request results in a miss at the L1 cache 120, and the cache controller 130 copies cache line-3 206 from the L2 cache 220 to the L1 cache 120 and provides the cache line-3 206 to the compute unit 115.

At a subsequent time T4, the cache controller 130 receives a request from a compute unit 115 for cache line-4 208. Because the L1 cache 120 does not contain cache line-4 208, the request results in a miss at the L1 cache 120. To make room for the cache line-4 208 at the L1 cache 120, the cache controller evicts cache line-1 202, as it is the least-recently-used cache line. The cache controller 130 copies cache line-4 208 from the L2 cache 220 to the L1 cache 120 and provides the cache line-4 208 to the compute unit 115.

At a subsequent time T5, the cache controller 130 receives a request from a compute unit 115 for cache line-5 210. Because the L1 cache 120 does not contain cache line-5 210, the request results in a miss at the L1 cache 120. To make room for the cache line-5 208 at the L1 cache 120, the cache controller evicts cache line-2 204, as it is the least-recently-used cache line. The cache controller 130 copies cache line-5 210 from the L2 cache 220 to the L1 cache 120 and provides the cache line-5 210 to the compute unit 115. Thus, for the first five cycles T1-T5 of access requests for cache lines 202, 204, 206, 208, 210, the cache hit rate is 0%.

Figure 3:
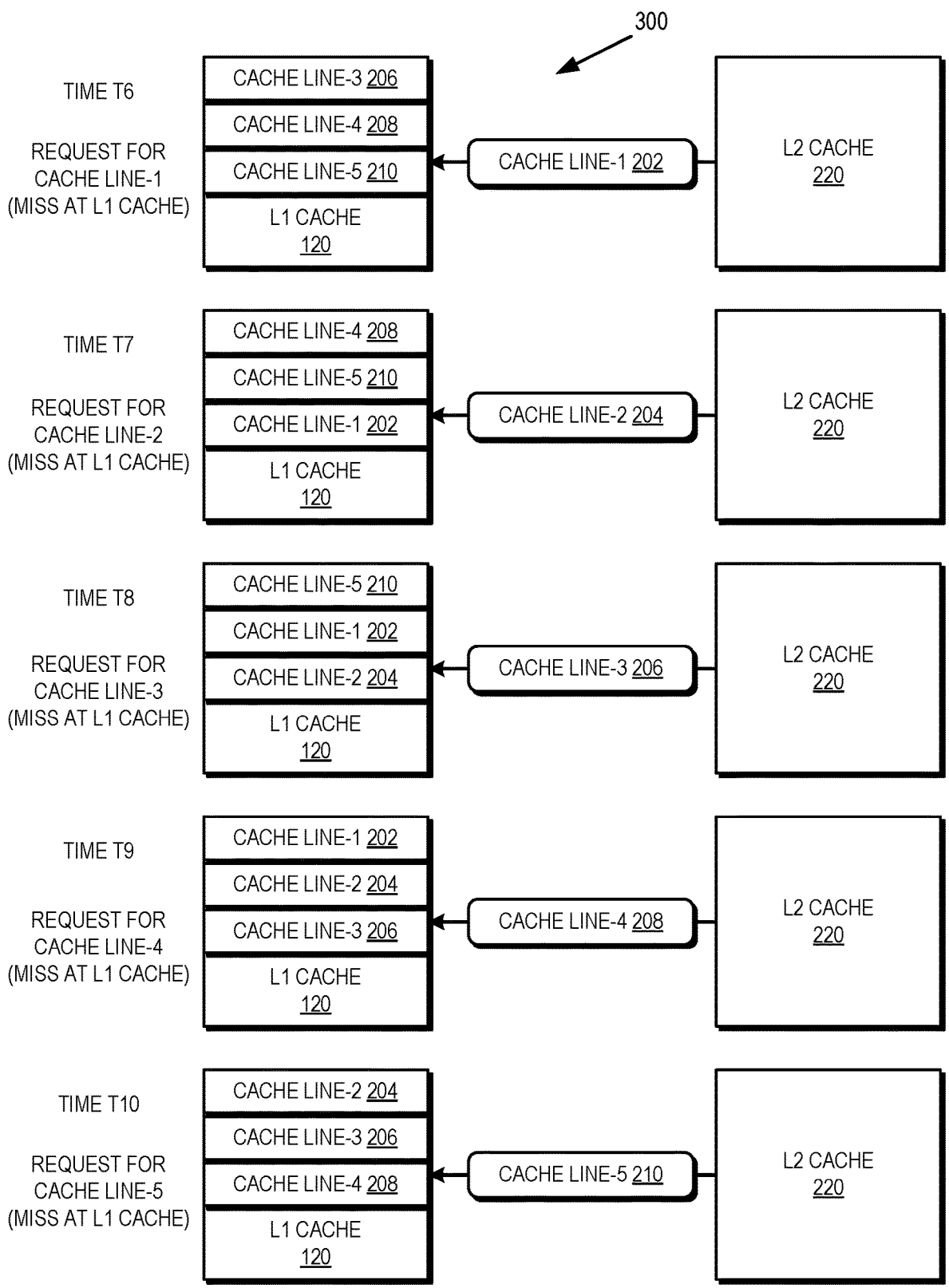
FIG. 3 is an illustration of caching of repeating patterns of data in accordance with some embodiments.

FIG. 3 is an illustration 300 of a continuation of caching of the repeating pattern of data of FIG. 2. At a subsequent time T6, the cache controller 130 receives a request from a compute unit 115 for cache line-1 202. Because the L1 cache 120 does not contain cache line-1 202 (because cache line-1 202 was previously evicted at time T4), the request results in a miss at the L1 cache 120. To make room for the cache line-1 202 at the L1 cache 120, the cache controller 130 evicts cache line-3 206, as it is the least-recently-used cache line. The cache controller 130 copies cache line-1 202 from the L2 cache 220 to the L1 cache 120 and provides the cache line-1 202 to the compute unit 115.

At a subsequent time T7, the cache controller 130 receives a request from a compute unit 115 for cache line-2 204. Because the L1 cache 120 does not contain cache line-2 204 (because cache line-2 202 was previously evicted at time T5), the request results in a miss at the L1 cache 120. To make room for the cache line-2 204 at the L1 cache 120, the cache controller 130 evicts cache line-4 208, as it is the least-recently-used cache line. The cache controller 130 copies cache line-2 204 from the L2 cache 220 to the L1 cache 120 and provides the cache line-2 204 to the compute unit 115.

At a subsequent time T8, the cache controller 130 receives a request from a compute unit 115 for cache line-3 206. Because the L1 cache 120 does not contain cache line-3 206 (because cache line-3 206 was previously evicted at time T6), the request results in a miss at the L1 cache 120. To make room for the cache line-3 206 at the L1 cache 120, the cache controller 130 evicts cache line-5 210, as it is the least-recently-used cache line. The cache controller 130 copies cache line-3 206 from the L2 cache 220 to the L1 cache 120 and provides the cache line-3 206 to the compute unit 115.

At a subsequent time T9, the cache controller 130 receives a request from a compute unit 115 for cache line-4 208. Because the L1 cache 120 does not contain cache line-4 208 (because cache line-4 208 was previously evicted at time T7), the request results in a miss at the L1 cache 120. To make room for the cache line-4 208 at the L1 cache 120, the cache controller evicts cache line-1 202, as it is the least-recently-used cache line. The cache controller 130 copies cache line-4 208 from the L2 cache 220 to the L1 cache 120 and provides the cache line-4 208 to the compute unit 115.

At a subsequent time T10, the cache controller 130 receives a request from a compute unit 115 for cache line-5 210. Because the L1 cache 120 does not contain cache line-4 208 (because cache line-5 210 was previously evicted at time T8), the request results in a miss at the L1 cache 120. To make room for the cache line-5 210 at the L1 cache 120, the cache controller evicts cache line-2 204, as it is the least-recently-used cache line. The cache controller 130 copies cache line-5 210 from the L2 cache 220 to the L1 cache 120 and provides the cache line-5 210 to the compute unit 115. Thus, for the repeating 5-cache-line pattern of data of cache lines 202, 204, 206, 208, 210, caching using an LRU replacement policy results in a 0% hit rate for the L1 cache 120 for cycles T6-T10, with no improvement over the 0% hit rate of the cold start scenario illustrated in FIG. 2.

Figure 4:
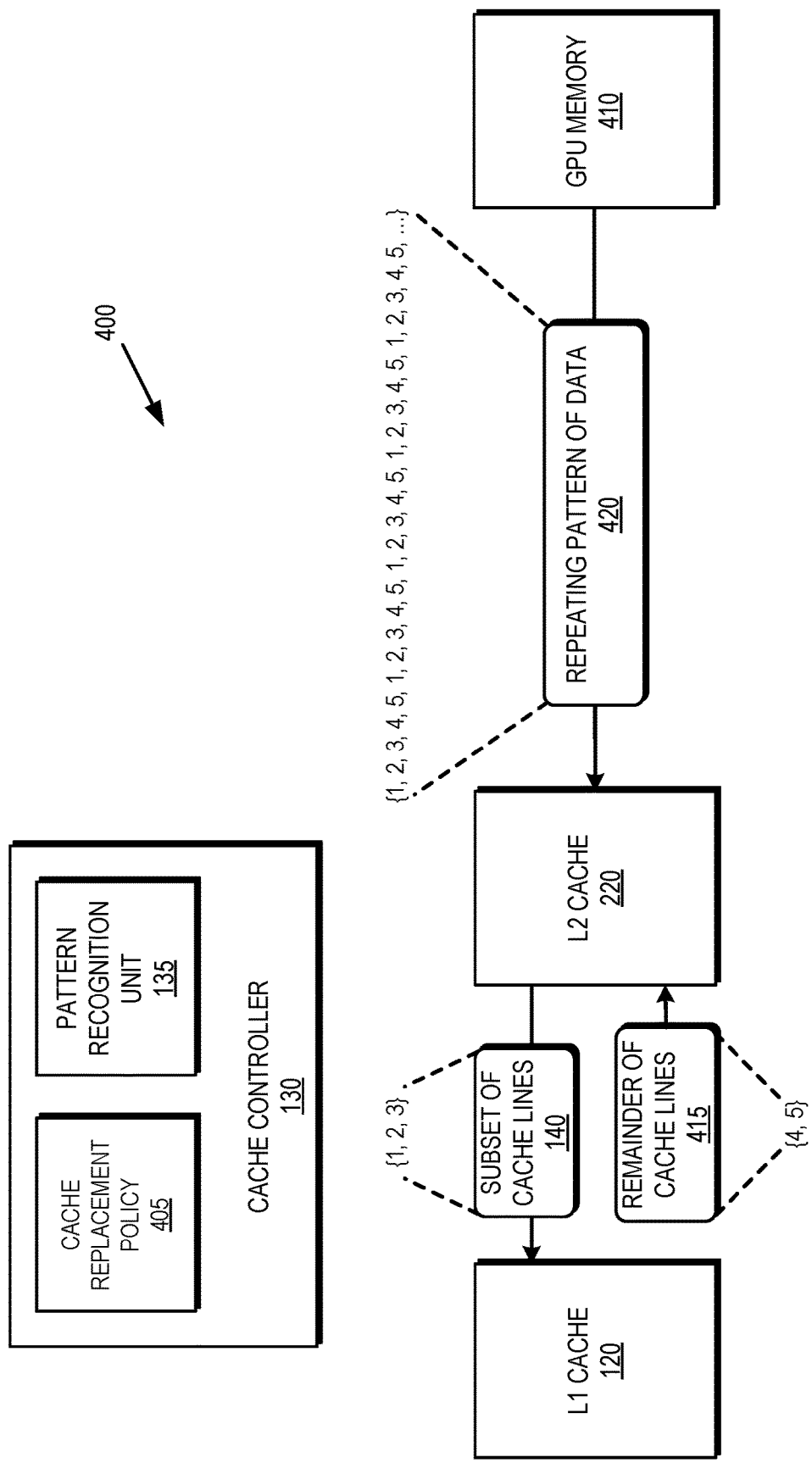
FIG. 4 is a block diagram of a cache controller allocating storage at a cache for only a subset of cache lines of a repeating pattern of data in accordance with some embodiments.

FIG. 4 is a block diagram 400 of the cache controller 130 of FIG. 1 allocating storage at the L1 cache 120 for only a subset 140 of cache lines of a repeating pattern of data 420 in accordance with some embodiments. In the illustrated example, the L1 cache 120 is sized to hold up to three cache lines at a time. The repeating pattern of data 420 includes five cache lines (1, 2, 3, 4, 5, 1, 2, 3, 4, 5, 1, 2, 3, 4, 5, . . . ), and therefore exceeds the storage capacity of the L1 cache 120. The cache controller 130 employs a cache replacement policy 405 that evicts the least-recently-used cache line in the event the L1 cache 120 is full when a cache line is fetched from a higher-level cache.

The pattern recognition unit 135 identifies the repeating pattern of data 420 as the data is fetched from GPU memory 410 and determines that cache lines of the repeating pattern of data 420 have a reuse distance that exceeds the storage capacity of the L1 cache 120. In response to the pattern recognition unit 135 determining that cache lines of the repeating pattern of data 420 have a reuse distance that exceeds the storage capacity of the L1 cache 120, the cache controller 130 allocates storage for only the subset 140 of cache lines (for example, cache lines 1, 2, and 3) that can be stored at one time in the L1 cache 120 and excludes the remainder of cache lines 415 (cache lines 4 and 5) of the repeating pattern of data 420 from the L1 cache 120. Thus, as the compute units 115 request each of cache lines 1, 2, and 3 of the subset 140 of cache lines, the cache controller allocates entries for the cache lines 1, 2, and 3 and stores them at the L1 cache 120. However, as the compute units 115 request the remainder of cache lines 415 (cache lines 4 and 5), the cache controller provides the remainder of cache lines 415 directly to the compute units 115 from the L2 cache 220 and bypasses storing the remainder of cache lines 415 at the L1 cache 120.

Figure 5:
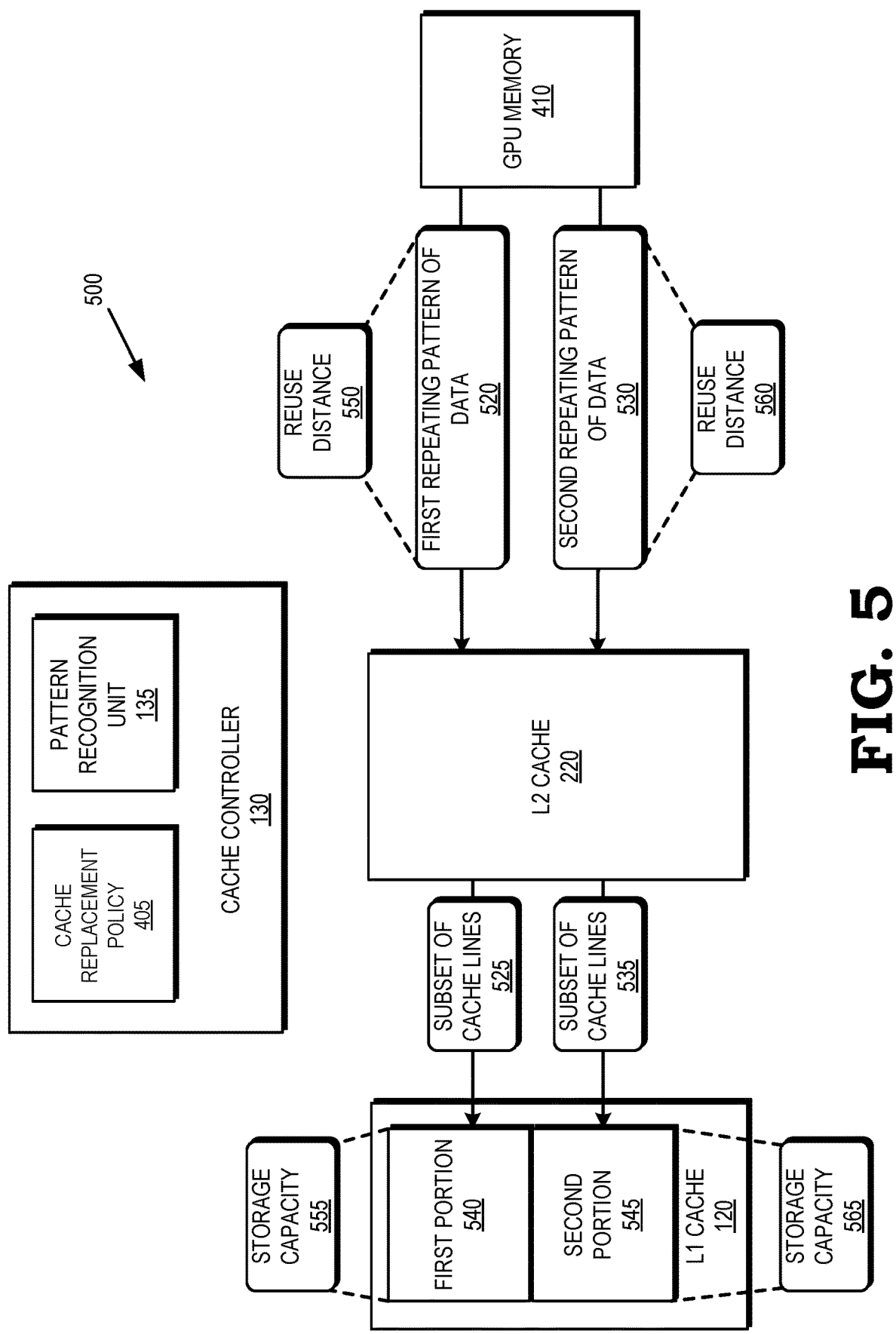
FIG. 5 is a block diagram of a cache controller partitioning a cache and allocating storage at portions of the cache for only subsets of cache lines of repeating patterns of data in accordance with some embodiments.

FIG. 5 is a block diagram 500 of the cache controller 130 partitioning the L1 cache 120 and allocating storage at portions of the cache for only subsets of cache lines of repeating patterns of data in accordance with some embodiments. At times, the parallel processing unit 110 processes draw calls that access more than one texture in parallel. In the illustrated example, the cache controller 130 fetches two textures from the GPU memory 410 for overlapping accesses: first repeating pattern of data 520 and second repeating pattern of data 530. To increase the hit rates for first repeating pattern of data 520 and second repeating pattern of data 530, the cache controller 130 partitions the L1 cache 120 into a first portion 540 and a second portion 545.

In response to the pattern recognition unit 135 identifying the first repeating pattern of data 520 and determining that a reuse distance 550 for cache lines of the first repeating pattern of data 520 exceeds a storage capacity 555 of the first portion 540 of the L1 cache, the cache controller 130 allocates storage at the first portion 540 to store a subset of cache lines 525 of the first repeating pattern of data 520. Similarly, in response to the pattern recognition unit 135 identifying the second repeating pattern of data 530 and determining that a reuse distance 560 for cache lines of the second repeating pattern of data 530 exceeds a storage capacity 565 of the second portion 545 of the L1 cache, the cache controller 130 allocates storage at the second portion 545 to store a subset of cache lines 535 of the second repeating pattern of data 530.

Figure 6:
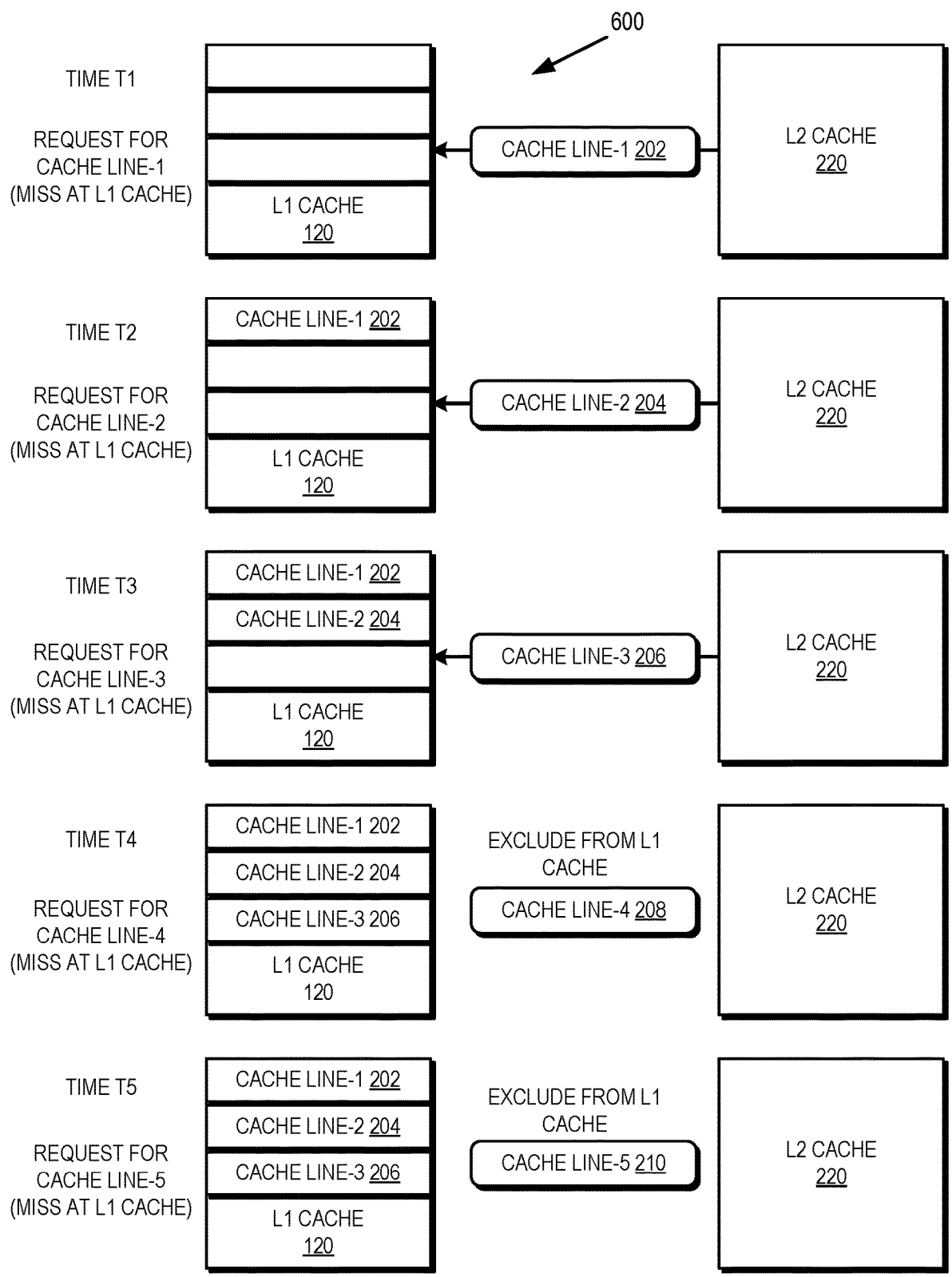
FIG. 6 is an illustration of selectively caching cache lines of a repeating pattern of data in accordance with some embodiments.

FIG. 6 is an illustration 600 of selectively caching cache lines of a repeating pattern of data in accordance with some embodiments. Similar to the illustration 200 of FIG. 2, the repeating pattern of data includes five cache lines, while the L1 cache 120 has a storage capacity of three cache lines. Unlike the illustration 200 of FIG. 2, however, the cache controller 130 implements selective caching for the repeating pattern of data in the illustrated example. In response to the pattern recognition unit 135 determining that the cache lines of the repeating pattern of data have a reuse distance that exceeds the storage capacity of the L1 cache 120, the cache controller allocates space in the L1 cache 120 for only a subset of the cache lines of the repeating pattern of data (cache lines 202, 204, and 206) and excludes the remainder of the cache lines of the repeating pattern of data from the L1 cache 120.

After the L1 cache 120 has been flushed, at a time T1, the cache controller 130 receives a request from a compute unit 115 for cache line-1 202. Because the L1 cache 120 contains no valid data, the request results in a miss at the L1 cache 120. Because cache line-1 202 is included in the subset of cache lines for which the cache controller 130 has allocated storage in the L1 cache 120, the cache controller 130 copies cache line-1 202 from the L2 cache 220 to the L1 cache 120 and provides the cache line-1 202 to the compute unit 115.

At a subsequent time T2, the cache controller 130 receives a request from a compute unit 115 for cache line-2 204. Because the L1 cache 120 does not contain cache line-2 204, the request results in a miss at the L1 cache 120. The cache controller 130 has included cache line-2 204 in the subset of cache lines for which storage has been allocated in the L1 cache 120, so the cache controller 130 copies cache line-2 204 from the L2 cache 220 to the L1 cache 120 and provides the cache line-2 204 to the compute unit 115.

At a subsequent time T3, the cache controller receives a request from a compute unit 115 for cache line-3 206. The L1 cache 120 does not contain cache line-3 206, so the request results in a miss at the L1 cache 120. The cache controller 130 has included cache line-3 206 in the subset of cache lines for which storage has been allocated in the L1 cache 120, so the cache controller 130 copies cache line-3 206 from the L2 cache 220 to the L1 cache 120 and provides the cache line-3 206 to the compute unit 115.

At a subsequent time T4, the cache controller 130 receives a request from a compute unit 115 for cache line-4 208. The L1 cache 120 does not contain cache line-4 208, so the request results in a miss at the L1 cache 120. Because the cache controller 130 has not included cache line-4 208 in the subset of cache lines of the repeating pattern of data for which storage has been allocated at the L1 cache 120, the cache controller provides cache line-4 208 directly from the L2 cache 220 to the compute unit 115 and excludes cache line-4 208 from the L1 cache 120.

At a subsequent time T5, the cache controller 130 receives a request from a compute unit 115 for cache line-5 210. The L1 cache 120 does not contain cache line-5 210, so the request results in a miss at the L1 cache 120. Because the cache controller 130 has not included cache line-5 210 in the subset of cache lines of the repeating pattern of data for which storage has been allocated at the L1 cache 120, the cache controller provides cache line-5 210 directly from the L2 cache 220 to the compute unit 115 and excludes cache line-5 210 from the L1 cache 120. Thus, similar to the illustration 200 of FIG. 2, for the first five cycles T1-T5 of access requests for cache lines 202, 204, 206, 208, 210, the cache hit rate is 0%.

Figure 7:
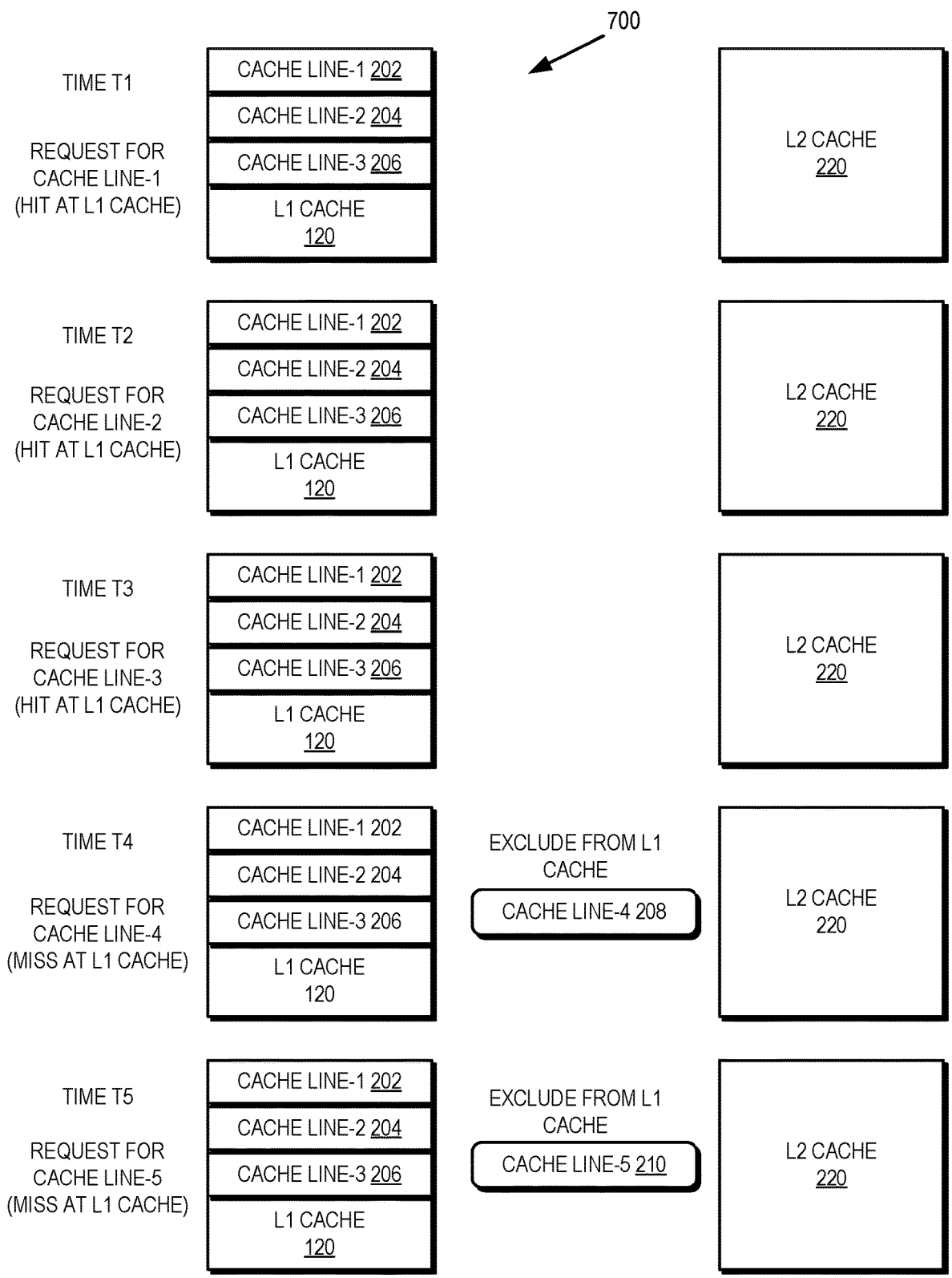
FIG. 7 is an illustration of selectively caching cache lines of a repeating pattern of data in accordance with some embodiments.

FIG. 7 is an illustration 700 of a continuation of selective caching of the repeating pattern of data of FIG. 6. At a subsequent time T6, the cache controller 130 receives a request from a compute unit 115 for cache line-1 202. Because the L1 cache 120 contains cache line-1 202, the request results in a hit at the L1 cache 120, and the cache controller 130 provides cache line-1 202 to the compute unit 115. At a subsequent time T7, the cache controller 130 receives a request from a compute unit 115 for cache line-2 204. Because the L1 cache 120 contains cache line-2 204, the request results in a hit at the L1 cache 120, and the cache controller 130 provides cache line-2 204 to the compute unit 115. At a subsequent time T8, the cache controller 130 receives a request from a compute unit 115 for cache line-3 206. Because the L1 cache 120 contains cache line-3 206, the request results in a hit at the L1 cache 120, and the cache controller 130 provides cache line-3 206 to the compute unit 115.

At a subsequent time T9, the cache controller 130 receives a request from a compute unit 115 for cache line-4 208. The L1 cache 120 does not contain cache line-4 208, because the cache controller 130 has excluded cache line-4 208 from the L1 cache 120. Therefore, the request results in a miss at the L1 cache 120. The cache controller 130 fetches cache line-4 208 from the L2 cache 220 and provides cache line-4 208 directly to the compute unit 115, bypassing storing cache line-4 208 at the L1 cache 120 because cache line-4 208 is not included in the subset of cache lines for which space has been allocated at the L1 cache 120.

At a subsequent time T10, the cache controller 130 receives a request from a compute unit 115 for cache line-5 210. The L1 cache 120 does not contain cache line-5 210, because the cache controller 130 has excluded cache line-5 210 from the L1 cache 120. Therefore, the request results in a miss at the L1 cache 120. The cache controller 130 fetches cache line-5 210 from the L2 cache 220 and provides cache line-5 210 directly to the compute unit 115, bypassing storing cache line-5 210 at the L1 cache 120 because cache line-5 210 is not included in the subset of cache lines for which space has been allocated at the L1 cache 120. Thus, for the repeating 5-cache-line pattern of data of cache lines 202, 204, 206, 208, 210, selective caching using an LRU replacement policy results in a 60% hit rate for the L1 cache 120 for cycles T6-T10, which is a significant increase over the 0% hit rate of the conventional caching scenario illustrated in FIG. 3. Further, additional cycles of the same repeating pattern of data can be expected to result in a similar increased hit rate for the L1 cache 120 using selective caching.

Figure 8:
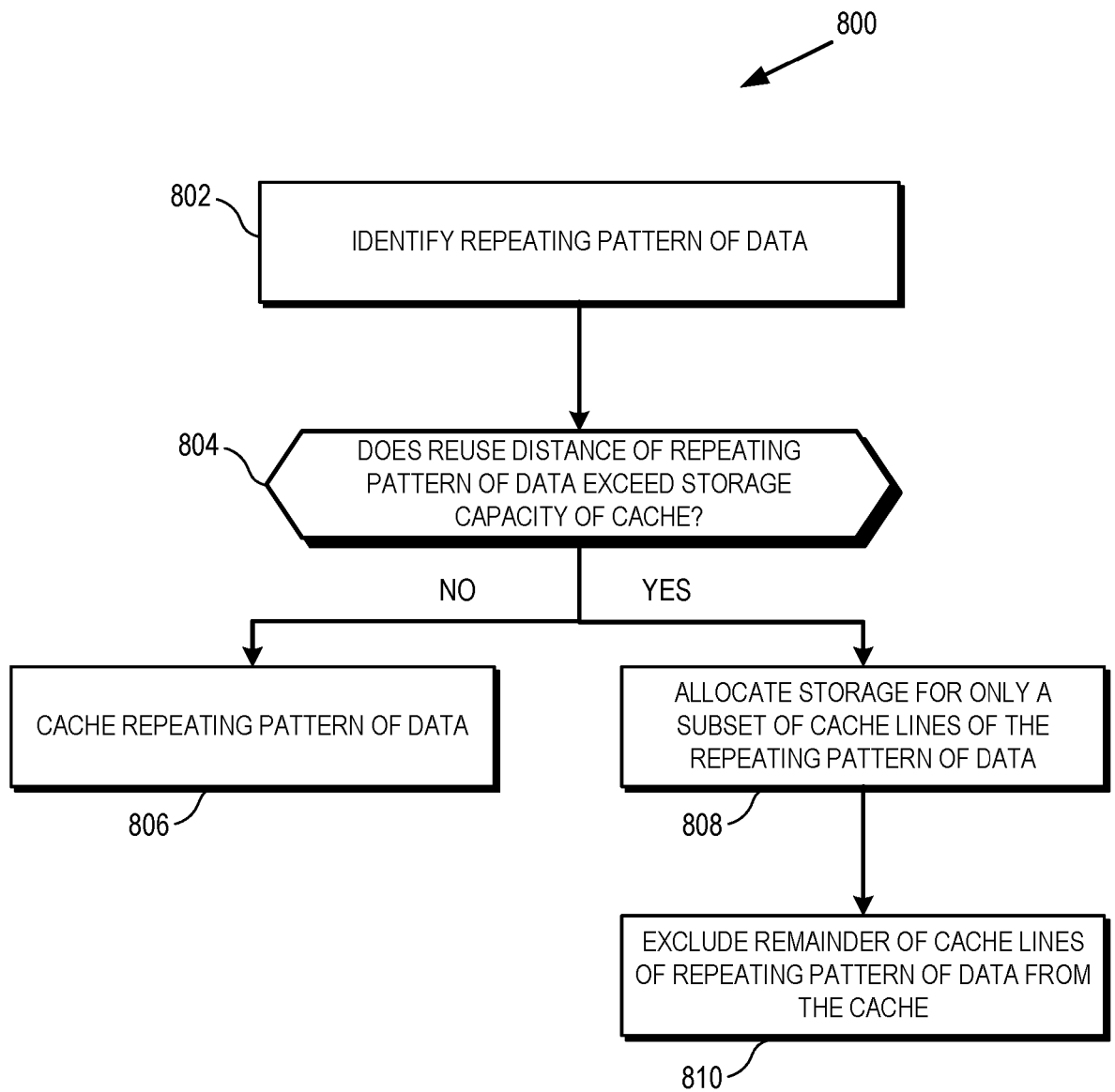
FIG. 8 is a flow diagram illustrating a method for selectively caching cache lines of a repeating pattern of data in accordance with some embodiments.

FIG. 8 is a flow diagram illustrating a method 800 for selectively caching cache lines of a repeating pattern of data in accordance with some embodiments. In some embodiments, the method 800 is performed by a processing system such as the processing system 100 illustrated in FIG. 1. At block 802, the pattern recognition unit 135 identifies a repeating pattern of data 420. At block 804, the pattern recognition unit 135 compares the reuse distance of a cache line of the repeating pattern of data 420 to the maximum number of cache lines the L1 cache 120 can store at one time and determines whether the reuse distance exceeds the storage capacity of the L1 cache 120.

If, at block 804, the pattern recognition unit 135 determines that the reuse distance of cache lines of the repeating pattern of data 420 does not exceed the storage capacity of the L1 cache 120, the method flow continues to block 806. At block 806, the cache controller 130 caches all cache lines of the repeating pattern of data at the L1 cache 120.

If, at block 804, the pattern recognition unit 135 determines that the reuse distance of cache lines of the repeating pattern of data 420 exceeds the storage capacity of the L1 cache 120, the method flow continues to block 808. At block 808, the cache controller 130 allocates storage at the L1 cache 120 for only a subset 140 of the cache lines of the repeating pattern of data 420 and excludes the remainder of cache lines 415 of the repeating pattern of data 420 from the L1 cache 120. In some embodiments, the pattern recognition unit 135 stochastically selects a subset of cache lines from the repeating pattern of data to store at the L1 cache 120 in an iterative process. The cache controller 130 measures a hit rate for each selected subset of cache lines and selects the subset 140 of cache lines of the repeating pattern of data 420 to exclude from the L1 cache 120 based on the hit rate.

In some embodiments, the cache controller 130 partitions the L1 cache 120 into a first portion 540 and a second portion 545. In response to the pattern recognition unit 135 identifying a first repeating pattern of data 520 and determining that the reuse distance for cache lines of the first repeating pattern of data 520 exceeds the storage capacity of the first portion 540 of the L1 cache, the cache controller 130 allocates storage at the first portion 540 to store a subset of cache lines 525 of the first repeating pattern of data 520.

In some embodiments, the apparatus and techniques described above are implemented in a system including one or more integrated circuit (IC) devices (also referred to as integrated circuit packages or microchips), such as the processing system described above with reference to FIGS. 1-8. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
responsive to a pattern of repeating data in which a single instance of the pattern of repeating data spans a number of cache lines that exceeds a storage capacity of a cache in which the pattern of repeating data is to be stored, allocating storage for only a subset of cache lines of the single instance at the cache.

2. The method of claim 1, further comprising:
bypassing storing a remainder of cache lines of the single instance at the cache.

3. The method of claim 2, wherein allocating storage for only the subset comprises: selecting cache lines of the pattern of repeating data that exceed the maximum number of cache lines that the cache can store as the remainder.

4. The method of claim 1, comprising determining that a reuse distance of a cache line of the single instance is greater than the number of cache lines that can be stored at the cache; and limiting the subset to the number of cache lines that can be stored at the cache.

5. The method of claim 4, further comprising:
iteratively selecting cache lines of the pattern of repeating data to exclude from the cache by:
determining a hit rate for the subset of cache lines of the pattern of repeating data that are not excluded from the cache; and
selecting cache lines of the pattern of repeating data to exclude from the cache based on the hit rate.

6. The method of claim 4, further comprising:
partitioning the cache into two or more portions; and
assigning a first portion of the cache to the pattern of repeating data; and
wherein determining that the reuse distance of a cache line of the single instance is greater than the number of cache lines that can be stored at the cache comprises determining that the reuse distance of a cache line of the single instance is greater than the number of cache lines that can be stored at the first portion of the cache.

7. The method of claim 1, wherein the pattern of repeating data comprises a texture.

8. A method comprising:
determining that a single instance of a pattern of repeating data spans a number of cache lines that exceed a storage capacity of a cache, the pattern of repeating data to be stored in cache lines of the cache; and
in response to the determining, allocating cache lines of the cache to only a subset of cache lines of the single instance.

9. The method of claim 8, further comprising:
bypassing storing a remainder of cache lines of the single instance at the cache.

10. The method of claim 9, wherein selecting the subset comprises:
selecting cache lines of the pattern of repeating data that exceed the maximum number of cache lines that the cache can store as the remainder.

11. The method of claim 8, further comprising:
determining that a reuse distance of a cache line of the single instance is greater than a number of cache lines that can be stored at the cache; and
limiting the subset to the number of cache lines that can be stored at the cache.

12. The method of claim 11, further comprising:
iteratively selecting cache lines of the pattern of repeating data to exclude from the cache by:
determining a hit rate for cache lines of the pattern of repeating data that are not excluded from the cache; and
selecting cache lines of the pattern of repeating data to exclude from the cache based on the hit rate.

13. The method of claim 11, further comprising:
partitioning the cache into two or more portions; and
assigning a first portion of the cache to the pattern of repeating data;
wherein determining that the reuse distance of a cache line of the single instance is greater than the number of cache lines that can be stored at the cache comprises determining that the reuse distance of a cache line of the single instance is greater than the number of cache lines that can be stored at the first portion of the cache.

14. The method of claim 8, wherein the pattern of repeating data comprises a texture.

15. A device comprising:
a parallel processing unit comprising a cache in which a pattern of repeating data is to be stored; and
a cache controller to:
responsive to a single instance of the pattern of repeating data having a number of cache lines that exceeds a storage capacity of the cache, allocate storage for only a subset of cache lines of the single instance at the cache.

16. The device of claim 15, wherein the cache controller is to:
bypass storing a remainder of cache lines of the pattern of repeating data at the cache.

17. The device of claim 16, wherein the cache controller is to:
select cache lines of the pattern of repeating data that exceed the maximum number of cache lines that the cache can store as the remainder.

18. The device of claim 15, wherein the cache controller is to:
determine whether a reuse distance of a cache line of the single instance is greater than the number of cache lines that can be stored at the cache; and
limit the subset to the number of cache lines that can be stored at the cache.

19. The device of claim 18, wherein the cache controller is to:
determine a hit rate for cache lines of the pattern of repeating data that are not excluded from the cache; and
select cache lines of the pattern of repeating data to exclude from the cache based on the hit rate.

20. The device of claim 18, wherein the cache controller is to:
partition the cache into two or more portions;
assign a first portion of the cache to the pattern of repeating data; and determine that the reuse distance of a cache line of the
single instance is greater than the number of cache lines that can be stored at the cache by determining that the reuse distance of a cache line of the single instance is greater than the number of cache lines that can be stored at the first portion of the cache.

* * * * *